United States Patent
Cai et al.

(10) Patent No.: US 11,777,184 B2
(45) Date of Patent: Oct. 3, 2023

(54) END COVER ASSEMBLY, SECONDARY BATTERY, BATTERY MODULE, APPARATUS, LIQUID-INJECTION METHOD AND DEVICE

(71) Applicant: CONTEMPORARY AMPEREX TECHNOLOGY CO., LIMITED, Ningde (CN)

(72) Inventors: Qichang Cai, Ningde (CN); Chengyou Xing, Ningde (CN); Libin Zhong, Ningde (CN); Wenwei Chen, Ningde (CN); Quankun Li, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/831,673

(22) Filed: Jun. 3, 2022

(65) Prior Publication Data
US 2022/0294093 A1 Sep. 15, 2022

Related U.S. Application Data

(63) Continuation of application No. PCT/CN2020/091108, filed on May 19, 2020.

(51) Int. Cl.
*H01M 50/645* (2021.01)
*H01M 50/148* (2021.01)
(Continued)

(52) U.S. Cl.
CPC ....... *H01M 50/645* (2021.01); *H01M 50/148* (2021.01); *H01M 50/186* (2021.01);
(Continued)

(58) Field of Classification Search
CPC .......... H01M 2220/20; H01M 50/148; H01M 50/15; H01M 50/186; H01M 50/60; H01M 50/636; H01M 50/645; Y02E 60/10
See application file for complete search history.

(56) References Cited

U.S. PATENT DOCUMENTS 2,240,314 A 4/1941 Reppert et al.
5,993,991 A * 11/1999 Jones ................. H01M 50/308
429/163

FOREIGN PATENT DOCUMENTS

CN 202042559 U 11/2011
CN 202495487 U 10/2012
(Continued)

OTHER PUBLICATIONS

European Patent Office, Extended European Search Report dated Dec. 8, 2022 for EP Application No. 209036418.1, 7 pages.
(Continued)

*Primary Examiner* — Lingwen R Zeng
(74) *Attorney, Agent, or Firm* — Haverstock & Owens, A Law Corporation

(57) ABSTRACT

The present application provides an end cover assembly, a secondary battery, a battery module, a device, a liquid-injection method and a device thereof. The end cover assembly for the secondary battery includes: an end cover, provided with a through hole for injecting electrolyte, and including a connecting portion; a sealing assembly, configured to seal the through hole; a locking-fixing member, configured to be movable relative to the connecting portion in a radial direction of the through hole, so as to realize switching between a locked state and an unlocked state of the locking-fixing member and the connecting portion. In the locked state, the locking-fixing member presses against the sealing assembly to restrict the end cover to be separated
(Continued)

from the sealing assembly; in the unlocked state, the end cover and the sealing assembly are separable to allow electrolyte to be injected from the through hole.

19 Claims, 7 Drawing Sheets

(51) Int. Cl.
    *H01M 50/186*     (2021.01)
    *H01M 50/60*     (2021.01)
    *H01M 50/15*     (2021.01)
    *H01M 50/636*     (2021.01)

(52) U.S. Cl.
    CPC ............ *H01M 50/15* (2021.01); *H01M 50/60* (2021.01); *H01M 50/636* (2021.01); *H01M 2220/20* (2013.01); *Y02E 60/10* (2013.01)

(56) References Cited

FOREIGN PATENT DOCUMENTS

| | | |
|---|---|---|
| CN | 202585544 U | 12/2012 |
| CN | 203746935 U | 7/2014 |
| CN | 205069696 U | 3/2016 |
| CN | 205881986 U | 1/2017 |
| CN | 107195855 A | 9/2017 |
| CN | 206992160 U | 2/2018 |
| CN | 207818752 U | 9/2018 |
| CN | 208819960 U | 5/2019 |
| CN | 209515756 U | 10/2019 |
| CN | 209843759 U | 12/2019 |
| JP | 2007257942 A | 10/2007 |
| JP | 2007323882 A | 12/2007 |
| JP | 2014099266 A | 5/2014 |
| JP | 2015082495 A | 4/2015 |
| JP | 2016162550 A | 9/2016 |
| JP | 2019029209 A | 2/2019 |
| WO | 2019088449 A1 | 5/2019 |

OTHER PUBLICATIONS

National Intellectual Property Administration, PRC (CNIPA), Decision to Grant dated Dec. 9, 2022 for Chinese Patent Application No. 20280063127.1, 8 pages.

* cited by examiner

END COVER ASSEMBLY, SECONDARY BATTERY, BATTERY MODULE, APPARATUS, LIQUID-INJECTION METHOD AND DEVICE

CROSS REFERENCE TO RELATED APPLICATION

The present application is a continuation of International Application No. PCT/CN2020/091108, filed on May 19, 2020, titled with "END COVER ASSEMBLY, SECONDARY BATTERY, BATTERY MODULE, APPARATUS, LIQUID-INJECTION METHOD AND DEVICE", which is hereby incorporated by reference in its entirety.

TECHNICAL FIELD

The present application relates to a technical filed of battery, and specifically relates to an end cover assembly, a secondary battery, a battery module, apparatus, a liquid injection method and a device therefor.

BACKGROUND

Because lithium-ion and other batteries have the advantages of high energy density, high power density, multiple using cycles, and long storage time, they have been widely used in electric vehicles.

The secondary battery includes a shell and an end cover assembly. The shell is configured to receive electrolyte. The end cover assembly is connected to the shell. During an operation process, the secondary battery undergoes multiple charge-and-discharge cycles, it will inevitably lead to the partial irreversible reaction consumption of the electrolyte, which will lead to a decrease in the usable capacity of the secondary battery. If the electrolyte can be added to the inside of the secondary battery during the operation process, it will be able to effectively slow down the degree of capacity reduction and increase the operation life of the secondary battery. However, in the related art, the assembled secondary battery cannot be refilled with the electrolyte, so that it will affects the operation life of the secondary battery.

SUMMARY

The present application provides an end cover assembly for a secondary battery, including an end cover, provided with a through hole for injecting electrolyte, and including a connecting portion; a sealing assembly, configured to seal the through hole; and a locking-fixing member, configured to be movable relative to the connecting portion in a radial direction of the through hole, so as to realize switching between a locked state and an unlocked state of the locking-fixing member and the connecting portion, in which in the locked state, the locking-fixing member presses against the sealing assembly to restrict the end cover from being separated from the sealing assembly, and in the unlocked state, the end cover and the sealing assembly are separable to allow electrolyte to be injected from the through hole.

The end cover assembly in the embodiments of the present application can be applied to a secondary battery, a predetermined amount of electrolyte can be injected into the secondary battery through the through hole, then the sealing assembly can seal the through hole, and finally the locking-fixing member can lock the connecting portion of the end cover. After the secondary battery is used for a predetermined period of time, the locking-fixing member unlocks the connecting portion of the end cover, and then the sealing assembly is removed to open the through hole. The predetermined amount of electrolyte can be replenished into the secondary battery through the through hole. After completing the electrolyte replenishment process, the sealing assembly seals the through hole, and the locking-fixing member locks the connecting portion of the end cover again, and the secondary battery can continue to be used normally. Thus, the secondary battery in the embodiments of the present application can be re-filled with the electrolyte after assembled, which can effectively prolong the operation life of the secondary battery.

Moreover, the embodiments of the present application provide a secondary battery including the end cover assembly as described above.

Furthermore, the embodiments of the present application provide a battery module including the secondary battery as described above.

Still furthermore, the embodiments of the present application provides an apparatus including the secondary battery as described above for supplying electrical power.

Still furthermore, the embodiments of the present application provide a liquid-injection method for the secondary battery, including providing the end cover, in which the end cover includes the through hole and the connecting portion,
injecting electrolyte through the through hole;
providing the sealing assembly;
mounting the sealing assembly to the end cover;
providing the locking-fixing member, and moving the locking-fixing member toward a direction close to the connecting portion in a radial direction of the through hole, so that the locking-fixing member locks the connecting portion to restrict the end cover being separated from the sealing assembly.

Still furthermore, the embodiments of the present application provide a liquid-injection device, for injecting the electrolyte into the secondary battery as described above, the device including a liquid injection component, configured to inject the electrolyte into the through hole; and
a dismounting-and-mounting component for the locking-fixing member, configured to move the locking-fixing member toward a direction close to the connecting portion in the radial direction of the through hole in the unlocked state, so that the locking-fixing member locks the connecting portion to restrict the end cover being separated from the sealing assembly; or configured to move the locking-fixing member toward a direction away from the connecting portion in the radial direction of the through hole, so that the locking-fixing member unlocks the connecting portion.

BRIEF DESCRIPTION OF THE DRAWINGS

The features, the advantages, and the technical effects in the exemplary embodiments of the present application will be described below with reference to the drawings.

Figure 1:
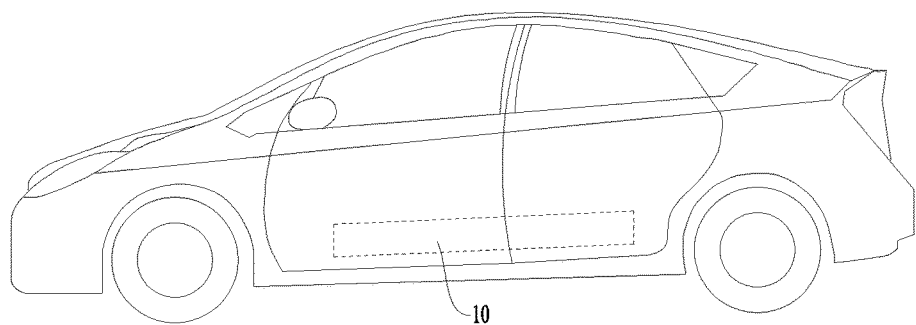
FIG. 1 shows a structural schematic view of a vehicle according to the embodiments of the present application.

In the drawings, the drawings are not drawn to the actual scale.

REFERENCE SIGNS 1 vehicle;
10 battery pack;
20 battery module set;
30 secondary battery; 31 shell; 32 electrode assembly; 321 main body; 321a end face; 322 tab;
40 end cover assembly;
50 end cover; 50a through hole; 50b concave slot; 50c electrode lead-out hole; 51 connecting portion; 511 snapping slot; 511a position-limiting wall; 52 body portion;
60 sealing assembly; 61 position-limiting member; 611 pressing-against portion; 612 position-limiting portion; 613 supporting portion; 614 accommodating slot; 62 sealing member;
70 locking-fixing member; 71 opening; 72 accommodating space;
80 electrode terminal;
90 adapter component;
X axial direction; Y peripheral direction.

DETAILED DESCRIPTION

The implementation of the present application will be described in further detail below in conjunction with the drawings and embodiments. The detailed description and drawings of the embodiments below are used to exemplarily illustrate the principle of the present application, but cannot be used to limit the scope of the present application, that is, the present application can be not limited to the described embodiments.

In the description of the present application, it should be noted that, unless otherwise specified, "plurality" means more than two; the terms "upper", "lower", "left", "right", "inner", "outer", etc. indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application. In addition, the terms "first", "second", "third", etc. are only used for descriptive purposes, and cannot be understood as indicating or implying relative importance. The term "perpendicular" does not mean strictly perpendicular, but within the allowable range of error. The term "parallel" does not mean strictly parallel, but within the allowable range of error.

The orientation words appearing in the following description are all directions shown in the drawings, and do not limit the specific structure of the present application. In the description of the present application, it should also be noted that, unless otherwise clearly specified and limited, the terms "mount", "communicate" and "connect" should be understood in a broad sense, for example, it can be a fixed connection, a detachable connection, or an integral connection, it can be a direct connection, or it can be connected indirectly through an intermedium. For those of ordinary skill in the art, the specific meaning of the above-mentioned terms in the present application can be understood according to specific situations.

In order to better understand the present application, the embodiments of the present application will be described below in conjunction with FIG. 1 to FIG. 15.

The embodiment of the present application provides a device using a secondary battery 30 as a power source. The device can be, but is not limited to, a vehicle, a ship, an aircraft or the like. As shown in FIG. 1, the embodiment of the present application provides the vehicle 1 including a vehicle main body and a battery module. The battery module is arranged in the vehicle main body. Herein, the vehicle 1 may be a pure electric vehicle, a hybrid electric vehicle or an extended-range vehicle. The vehicle main body is provided with a driving motor electrically connected to the battery module. The battery module can supply electrical power to the driving motor. The driving motor is connected to wheels in the vehicle main body through a transmission mechanism to drive the vehicle to travel forward. Optionally, the battery module may be horizontally arranged at a bottom of the vehicle main body.

Figure 2:
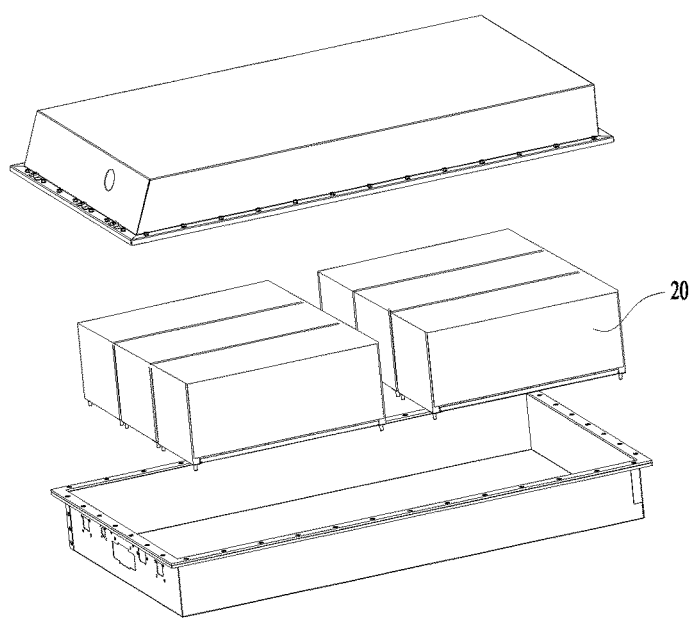
FIG. 2 shows an exploded structural schematic view of a battery pack according to an embodiment of the present application.

As shown in FIG. 2, the battery module may be a battery pack 10. There are many ways to arrange the battery pack 10. In some optionally embodiments, the battery pack 10 includes a housing and the battery module set 20 arranged in the housing. The number of battery module set 20 is one or more. One or more battery module sets 20 are arranged in the housing in array. The type of housing is not limited. The housing can be a frame-shaped housing, a disk-shaped housing, a box-shaped housing or the like. Optionally, the housing includes a lower housing for accommodating the battery module set 20 and an upper housing covered with the lower housing. The upper housing and the lower housing are covered and closed with each other to form an accommodating portion for receiving the battery module set 20. In another optional embodiment, the battery pack 10 includes the housing and a plurality of secondary batteries 30 directly arranged in the housing.

Figure 3:
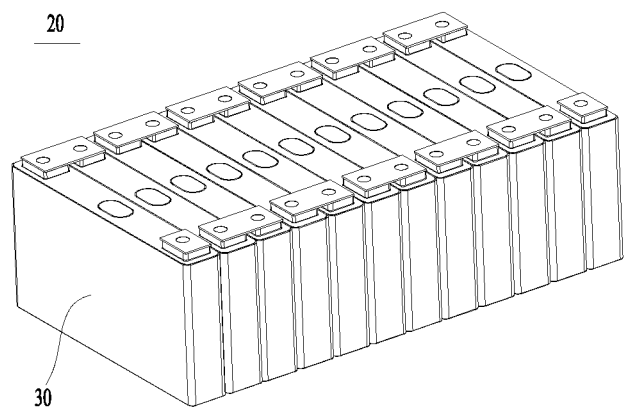
FIG. 3 shows a partial structural schematic view of a battery module set according to an embodiment of the present application.

As shown in FIG. 3, the battery module may also be the battery module set 20, and the plurality of battery module sets 20 are arranged in the housing and mounted on the vehicle main body.

As shown in FIG. 3, the battery module set 20 includes the plurality of secondary batteries 30. There are many ways to arrange the battery module set 20. In an embodiment, the battery module set 20 includes the accommodating portion and the plurality of secondary batteries 30 located in the accommodating portion. The plurality of secondary batteries 30 are arranged side by side in the accommodating portion. There are many ways to arrange the accommodating portion, for example, the accommodating portion includes a shell and a cover plate arranged at the shell; or the accommodating portion includes side plates and end plates that are successively connected with one another to enclose; or the accommodating portion includes end plates arranged opposite each other and a band around the outside of the secondary battery 30 and the end plates.

After noticing the problem that the operation life of the secondary battery 30 is short and the secondary battery 30 cannot be reused, the applicant has conducted the research and the analysis on the various structures of the secondary battery 30. The applicant found that there is irreversible reaction consumption of electrolyte of the secondary battery 30, resulting in a decrease in a using capacity of the secondary battery 30. At the same time, if the electrolyte can be replenished, the degree of the reduction of the capacity of the secondary battery 30 will be effectively slowed down. However, since the factors such as the safety, the sealing and the like need to be considered in an existing structural design of the secondary battery 30, the assembled secondary battery 30 cannot be refilled with the electrolyte.

Based on the above-mentioned problems discovered by the inventors, the inventors has improved the structure of the secondary battery 30, and the embodiments of the present application will be further described below.

Figure 4:
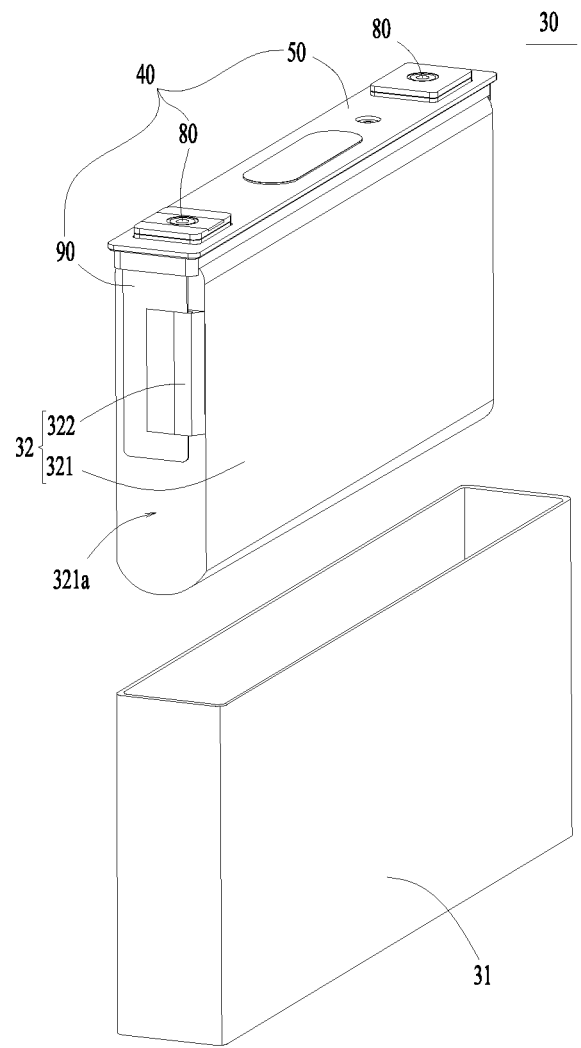
FIG. 4 shows an exploded structural schematic view of a secondary battery according to an embodiment of the present application.

As shown in FIG. 4, the secondary battery 30 in the embodiments of the present application includes a shell 31 and an electrode assembly 32 arranged in the shell 31. The shell 31 in the embodiments of the present application has a cuboid structure or other shapes. The shell 31 has an internal space for receiving the electrode assembly 32 and the electrolyte, and an opening communicating with the internal space. The shell 31 may be made of materials such as aluminum, aluminum alloy, plastic or the like. The electrode assembly 32 in the embodiments of the present application can be formed by stacking or winding a first electrode sheet, a second electrode sheet and a separator located between the first electrode sheet and the second electrode sheet and serving as an insulator between the first electrode sheet and the second electrode sheet. In this embodiment, exemplarily, the first electrode sheet is the positive electrode sheet, and the second electrode sheet is the negative electrode sheet. Each of the positive electrode sheet and the negative electrode sheet includes a coated region and an uncoated region. A positive electrode sheet active material coats the coated region of the positive electrode sheet, and a negative electrode sheet active material coats the coated region of the negative electrode sheet. On the coated region, the active material coats a current collector formed by a thin-plate metal foil, and the active material does not coat the uncoated region. After being wound or stacked, the electrode assembly 32 includes two tabs 322 which are a positive tab and a negative tab respectively. The coated region of the positive electrode sheet and the coated region of the negative electrode sheet form a main body 321. The uncoated regions of the positive electrode sheets are stacked to form the positive tab, and the uncoated regions of the negative electrode sheets are stacked to form the negative tab. In the embodiments of the present application, the main body 321 has two end faces 321a arranged to be opposite to each other in a length direction, and the positive electrode tab and the negative electrode tab respectively extend beyond the two opposite end faces 321a of the main body 321 in the length direction.

As shown in FIG. 4, the secondary battery 30 in the embodiments of the present application further includes an end cover assembly 40 sealingly connected to the shell 31. The end cover assembly 40 includes an end cover 50, electrode terminal 80, an adapter component 90, sealing assembly 60 and a locking-fixing member 70. The electrode terminal 80 is arranged on the end cover 50. The electrode terminal 80 is electrically connected to the tab 322 of the electrode assembly 32 through the adapter component 90. The shape of the electrode terminal 80 may be square or circle, which is not limited here.

Figure 5:
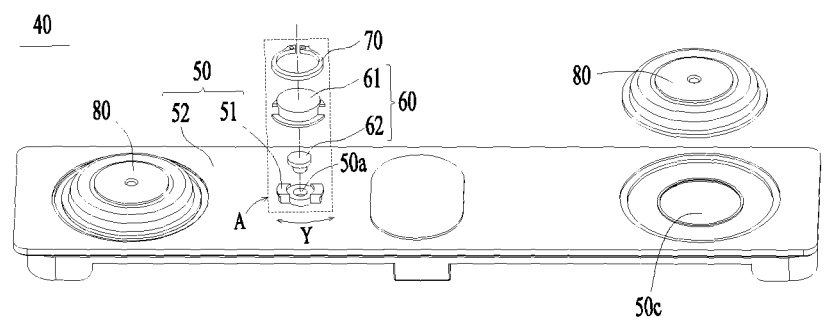
FIG. 5 shows a partial exploded structural schematic view of an end cover assembly according to an embodiment of the present application.
Figure 6:
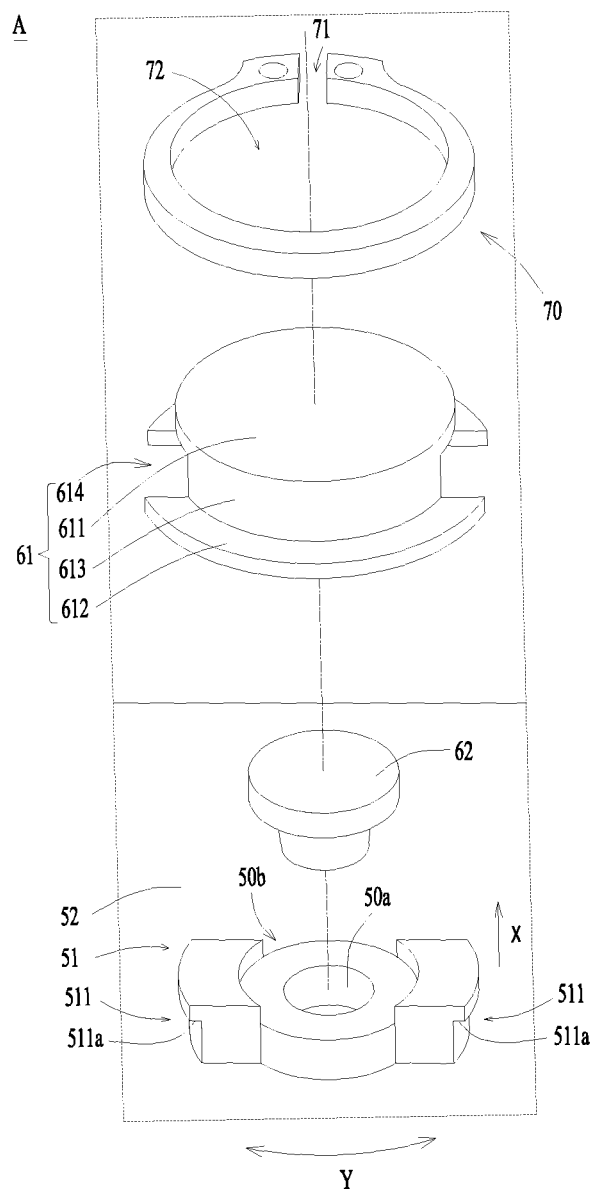
FIG. 6 shows an enlarged view of a portion A in FIG. 5.
Figure 7:
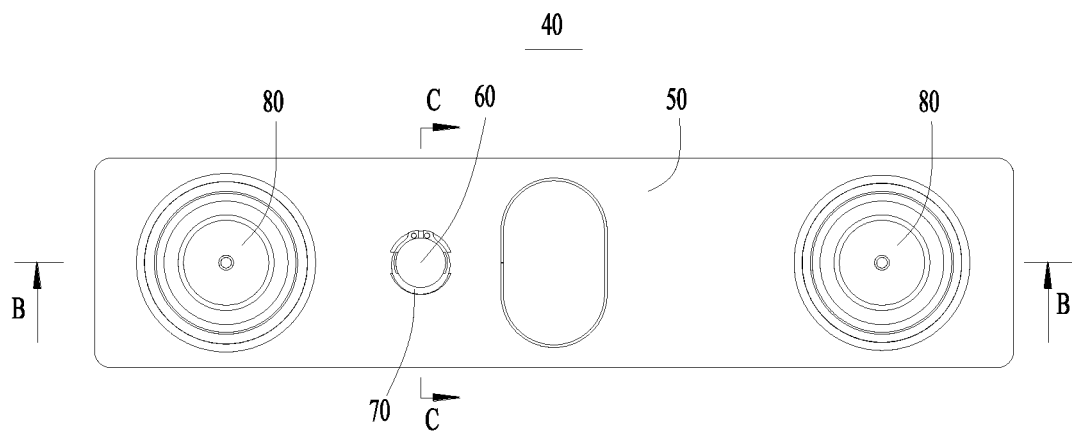
FIG. 7 is a structural schematic top view of the end cover assembly of the embodiment shown in FIG. 5 in an assembling state.
Figure 8:
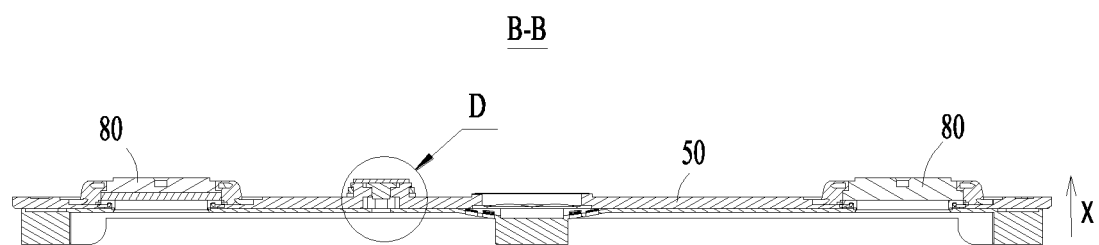
FIG. 8 shows a cross-sectional structural schematic view at a line B-B in FIG. 7.

As shown in FIG. 5 and FIG. 6, the end cover 50 in the embodiments of the present application is provided with an electrode lead-out hole 50c. The electrode lead-out hole 50c penetrates the end cover 50. The electrode terminal 80 is arranged on the end cover 50 and covers the electrode lead-out hole 50c. The end cover 50 is also provided with a through hole 50a for injecting electrolyte. The through hole 50a and the electrode lead-out hole 50c are arranged to be spaced apart from each other. The end cover 50 has a connecting portion 51. The sealing assembly 60 is configured to seal the through hole 50a on the end cover 50. The locking-fixing member 70 is configured to be movable relative to the connecting portion 51 of the end cover 50 in a radial direction of the through hole 50a, so as to switch between a locked state and an unlocked state of the locking-fixing member 70 and the connecting portion 51. The radial direction of the through hole 50a refers to a direction perpendicular to an axial direction X of the through hole 50a. When the locking-fixing member 70 and the connecting portion 51 are in the locked state, the locking-fixing member 70 presses against the sealing assembly 60 to restrict the end cover 50 from being separated from the sealing assembly 60. When the locking-fixing member 70 and the connecting portion 51 are in the unlocked state, the end cover 50 and the sealing assembly 60 are separable to allow the electrolyte to be injected from the through hole 50a.

In the secondary battery 30 in the embodiments of the present application, a predetermined amount of electrolyte can be injected into the secondary battery 30 through the through hole 50a, then the sealing assembly 60 can seal the through hole 50a, and finally the locking-fixing member 70 can lock the connecting portion 51 of the end cover 50. After the secondary battery 30 is used for a predetermined period of time, the locking-fixing member 70 unlocks the connecting portion 51 of the end cover 50, and then the sealing assembly 60 is removed to open the through hole 50a. The predetermined amount of electrolyte can be replenished into the secondary battery 30 through the through hole 50a. After completing the electrolyte replenishment process, the sealing assembly 60 seals the through hole 50a, and the locking-fixing member 70 locks the connecting portion 51 of the end cover 50 again, and the secondary battery 30 can continue to be used normally. Thus, the secondary battery 30 in the embodiments of the present application can be re-filled with the electrolyte after assembled, which can effectively prolong the operation life of the secondary battery 30.

In an embodiment, as shown in FIG. 6, the locking-fixing member 70 has an opening 71 and an accommodating space 72 communicating with each other. The connecting portion 51 is configured to enter the accommodating space 72 through the opening 71. When the locking-fixing member 70 moves in the radial direction of the through hole 50a, the connecting portion 51 enters the accommodating space 72 through the opening 71. After the connecting portion 51 enters the accommodating space 72, the locking-fixing member 70 locks the connecting portion 51. When the locking-fixing member 70 moves in the radial direction of the through hole 50a, the connecting portion 51 can move out of the accommodating space 72 through the opening 71, so that the locking-fixing member 70 and the connecting portion 51 can be unlocked. In an example, a part of the locking-fixing member 70 where the opening 71 is formed has the good ability of the elastic deformation. The size of the opening 71 of the locking-fixing member 70 is smaller than the size of the accommodating space 72. The size of the opening 71 of the locking-fixing member 70 is smaller than the size of the connecting portion 51, so that when the connecting portion 51 enters the opening 71 or the connecting portion 51 moves out of the opening 71, the size of the opening 71 will become larger to provide a position to the connecting portion 51, and the connecting portion 51 can pass through the opening 71 smoothly. A part of the locking-fixing member 70 where the accommodating space 72 is formed also has the good ability of the elastic deformation. After the connecting portion 51 enters the accommodating space 72, the part of the locking-fixing member 70 where the accommodating space 72 is formed will return to an original state, so that the locking-fixing member 70 can lock the connecting portion 51 of the end cover 50 through the part of the locking-fixing member 70 where the accommodating space 72 is formed. After the connecting portion 51 enters the accommodating space 72, the locking-fixing member 70 is not easy to move in the radial direction of the through hole 50a, so that the connecting portion 51 is not easily detached from the opening 71.

In an embodiment, as shown in FIG. 6, the locking-fixing member 70 is snap-fitted with the connecting portion 51 of the end cover 50, so that the locking-fixing member 70 and the connecting portion 51 are in the locked state. The locking-fixing member 70 is detachably connected to the connecting portion 51 of the end cover 50 by means of the snapping connection, so that the locking-fixing member 70 and the connecting portion 51 can be quickly locked or unlocked to separate.

In an embodiment, as shown in FIG. 6, the connecting portion 51 of the end cover 50 is provided with a snapping slot 511, and at least a part of the locking-fixing member 70 is located in the snapping slot 511 to restrict the locking-fixing member 70 from moving in the axial direction X of the through hole 50a. During the operation process of the secondary battery 30, the secondary battery 30 may vibrate or impact in the axial direction X of the through hole 50a. Since the locking-fixing member 70 is restricted by the connecting portion 51, the locking-fixing member 70 and the connecting portion 51 are less likely to move relatively to each other in the axial direction X of the through hole 50a, thereby reducing the possibility that the locking-fixing member 70 and the connecting portion 51 are disconnected or loosen with each other because of the movement of the locking-fixing member 70 in the axial direction X of the through hole 50a, and reducing the possibility that the sealing is failed and the electrolyte overflows from the through hole 50a because of the movement of the sealing assembly 60 in the axial direction X of the through hole 50a. In an example, the snapping slot 511 has a position-limiting wall 511a for resisting against the locking-fixing member 70 in the axial direction. A surface of the locking-fixing member 70 away from the end cover 50 is in contact with the position-limiting wall 511a, and the locking-fixing member 70 and the position-limiting wall 511a are in a surface-to-surface contact.

Figure 9:
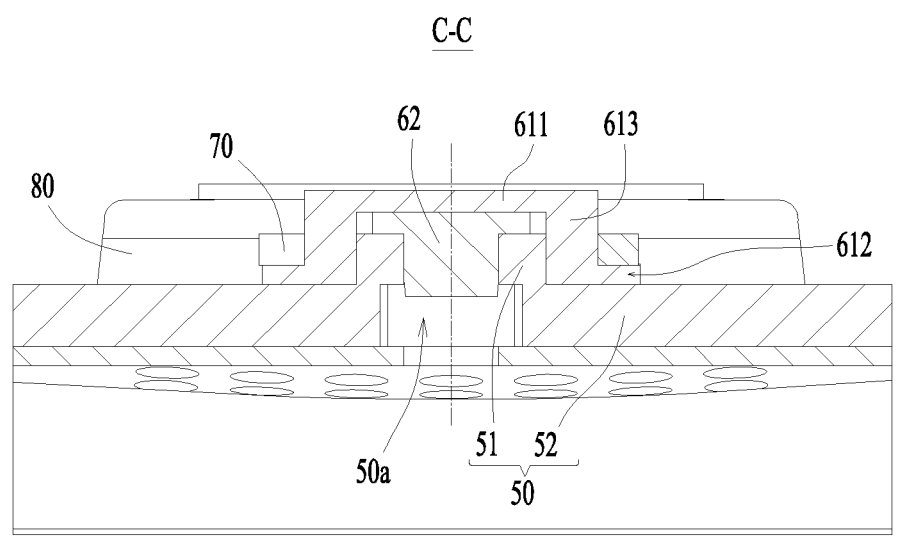
FIG. 9 shows a cross-sectional structural schematic view at a line C-C in FIG. 7.

In an embodiment, as shown in FIG. 6, the sealing assembly 60 includes a position-limiting member 61 and a sealing member 62. The sealing member 62 is arranged between the position-limiting member 61 and the end cover 50, and seals the through hole 50a. After the locking-fixing member 70 is connected to the connecting portion 51, the locking-fixing member 70 can press against the position-limiting member 61, so that the limiting-fixing member 61 exerts a compressive stress on the sealing member 62, thereby restricting the sealing member 62 from moving in the axial direction X of the through hole 50a, so that the sealing member 62 can seal the through hole 50a. In an example, referring to FIGS. 7 to 9, a part of the sealing member 62 extends into the through hole 50a, and another part of the sealing member 62 is located outside the through hole 50a. The part of the sealing member 62 extending into the through hole 50a is in an interference fit with the through hole 50a, and the part located outside the through hole 50a covers the through hole 50a, thereby improving the sealing performance of the sealing member 62. Optionally, the material of the sealing member 62 may be the rubber or the silicone. In an example, as shown in FIG. 6 and FIG. 9, the position-limiting member 61 includes a pressing-against portion 611 and a position-limiting portion 612. The pressing-against portion 611 is connected to the position-limiting portion 612 and covers at least a part of the sealing member 62. In some embodiments, the pressing-against portion 611 covers the entire sealing member 62. At least part of the position-limiting portion 612 is located at a side of the locking-fixing member 70 close to the end cover 50. The locking-fixing member 70 presses against the position-limiting portion 612 to restrict the end cover 50 from being separated from the sealing assembly 60. The locking-fixing member 70 exerts the compressive stress in the axial direction X of the through hole 50a to a surface of the position-limiting portion 612 away from the end cover 50 from a side of the position-limiting portion 612 away from the end cover 50, and the pressing-against portion 611 exerts a compressive stress in the axial direction X of the through hole 50a to the sealing member 62, so that the pressing-against portion 611 presses and fixes the sealing member 62.

In one embodiment, referring to FIG. 6 and FIG. 9, the end cover 50 further includes a body portion 52. The connecting portion 51 is a boss protruding from a surface of the body portion 52. The through hole 50a penetrates the connecting portion 51 and the body portion 52. At least part of the sealing member 62 is located at a side of the connecting portion 51 in the axial direction X of the through hole 50a. In an example, the body portion 52 has a rectangular plate-shaped structure. The connecting portion 51 includes a middle column-shaped portion and two columns. The two columns are located at two opposite sides of the middle column-shaped portion, that is, the middle column-shaped portion is located between the two columns. The through hole 50a penetrates the middle column-shaped portion. The snapping slots 511 are respectively formed in the two columns. Optionally, the two columns are evenly spaced apart from each other in the peripheral direction Y of the through hole 50a. The locking-fixing member 70 has an annular structure. The locking-fixing member 70 is snap-fitted in the snapping slots 511 in the two columns, so as to be in a locked state with the connecting portion 51. When locking or unlocking the locking-fixing member 70 and the connecting portion 51, an auxiliary tool can be used to expand the opening 71 of the locking-fixing member 70 in advance, so that the two columns can pass through the opening 71 into the accommodating space 72 or move out of the accommodating space 72 smoothly.

Figure 10:
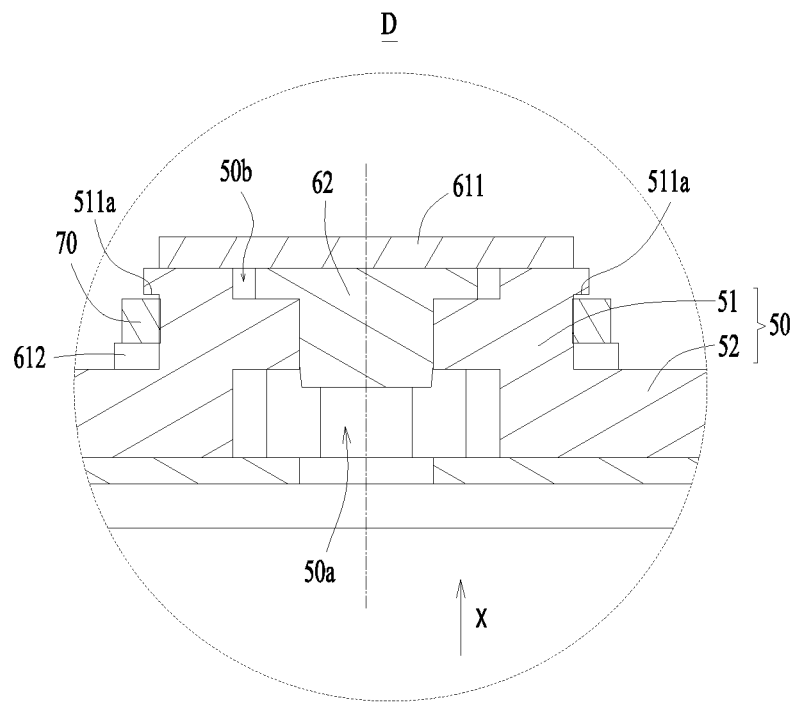
FIG. 10 shows an enlarged view of a portion D in FIG. 8.

In an embodiment, referring to FIGS. 6 and 10, the position-limiting member 61 further includes a supporting portion 613 and an accommodating slot 614. The supporting portion 613 is connected to the pressing-against portion 611 and the position-limiting portion 612. The accommodating slot 614 penetrates the supporting portion 613 in the radial direction of the through hole 50a. In the radial direction of the through hole 50a, the connecting portion 51 of the end cover 50 passes through the accommodating slot 614. The accommodating slot 614 and the connecting portion 51 of the end cover 50 can be inserted and engaged with each other in the axial direction X of the through hole 50a. The part of the connecting portion 51 located outside the accommodating slot 614 is used for locking the locking-fixing member 70 and is arranged in an offset manner with the position-limiting portion 612 of the position-limiting member 61 in the peripheral direction Y of the through hole 50a. The position-limiting wall 511a of the snapping slot 511 is arranged on the portion of the connecting portion 51 that is located outside the accommodating slot 614. The position-limiting member 61 is restricted by the part of the connecting portion 51 located inside the accommodating slot 614, so that the position-limiting member 61 cannot rotate relative to the connecting portion 51.

After the electrolyte is injected into the secondary battery 30 through the through hole 50a, the sealing member 62 is placed on the connecting portion 51, and then the position-limiting member 61 is inserted and engaged with the connecting portion 51 in the axial direction X of the through hole 50a. Then, the locking-fixing member 70 is moved in the radial direction of the through hole 50a and snap-fitted with the snapping slot 511 of the connecting portion 51 to lock the locking-fixing member 70 and the connecting portion 51. The locking-fixing member 70 can restrict the position-limiting member 61 and the sealing member 62, and restrict the position-limiting member 61 and the sealing member 62 to move in the axial direction X of the through hole 50a. When the electrolyte needs to be replenished into the secondary battery 30, the locking-fixing member 70 is first moved in the radial direction of the through hole 50a and removed from the snapping slot 511 to detach the locking-fixing member 70 from the connecting portion 51. In this way, the position-limiting member 61 and the sealing member 62 are removed in the axial direction X of the through hole 50a, and the through hole 50a is exposed. The electrolyte is replenished to the secondary battery 30 through the through hole 50a.

In one embodiment, as shown in FIGS. 6 and 10, the end cover 50 has a concave slot 50b. The through hole 50a communicates with the concave slot 50b. At least a part of the sealing member 62 is accommodated in the concave slot 50b, so that it is beneficial to reduce the size of the end cover assembly 40 in the axial direction X of the through hole 50a, and the energy density of the secondary battery 30 can be increased. The concave slot 50b is arranged in the connecting portion 51 in the axial direction X of the through hole 50a, the concave slot 50b is arranged corresponding to the middle-shaped column portion.

In an embodiment, referring to FIG. 11 to FIG. 15, the same structures between the end cover assembly 40 in this embodiment and the end cover assembly 40 in the embodiment shown in FIG. 5 to FIG. 10 will not be repeated here, and the differences will be mainly described. The connecting portion 51 is a column-shaped boss. The snapping slot 511 formed on the connecting portion 51 is an annular snapping slot 511. The locking-fixing member 70 has the annular structure with an opening 71, so that the locking-fixing member 70 can be snap-fitted into the snapping slot 511 of the connecting portion 51 at different positions. The through hole 50a is located outside the connecting portion 51, that is, the through hole 50a is spaced apart from the connecting portion 51 in the radial direction of the through hole 50a. The through hole 50a penetrates the body portion 52. In an example, two or more through holes 50a are arranged to be spaced apart from one another evenly around the connecting portion 51. Each of the position-limiting member 61 and the sealing member 62 has an annular structure. Each of the position-limiting member 61 and the sealing member 62 is used to be sleeved and connected with the connecting portion 51. The portion of the position-limiting member 61 that is located at the side of the locking-fixing member 70 close to the end cover 50 forms a position-limiting portion 612, and the pressing-against portion 611 is located at the outer periphery of the position-limiting portion 612. After the position-limiting member 61 and the sealing member 62 are sleeved on the connecting portion 51, the portion of the connecting portion 51 where the snapping slot 511 is arranged passes through the position-limiting member 61, so that it is convenient for the locking-fixing member 70 to be snap-fitted and fixed to the snapping slot 511 at the side of the position-limiting member 61 away from the sealing member 62. The locking-fixing member 70 exerts the compressive stress in the axial direction X of the through hole 50a to the position-limiting portion 612 from the side of the position-limiting portion 612 away from the sealing member 62, so that the pressing-against portion 611 exerts the compressive stress in the axial direction X of the through hole 50a to the sealing member 62, thereby compressing and fixing the sealing member 62. At least a part of the sealing member 62 is arranged between the pressing-against portion 611 and the end cover 50, and seals all the through holes 50a.

Figure 11:
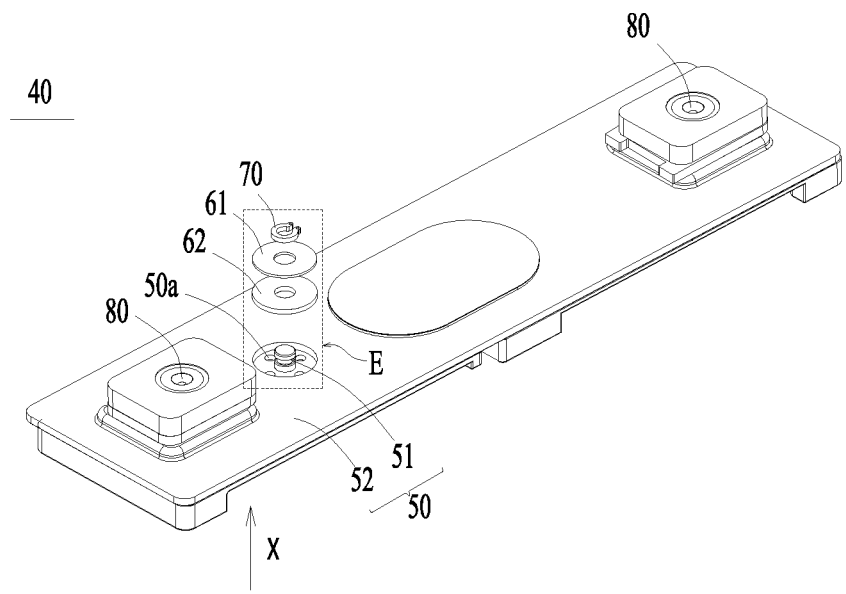
FIG. 11 shows a partial exploded structural schematic view of an end cover assembly according to another embodiment of the present application.
Figure 12:
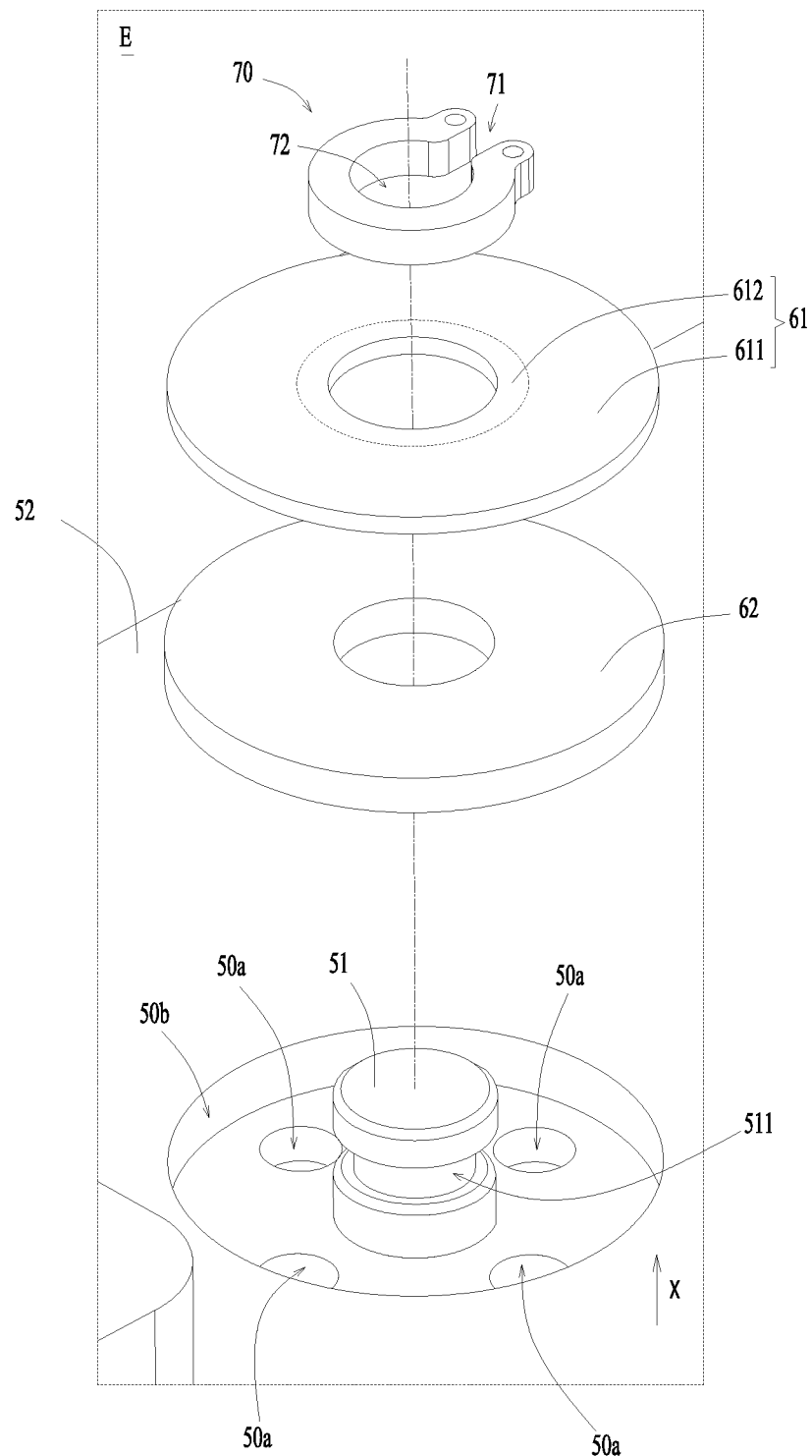
FIG. 12 shows an enlarged view of a portion E in FIG. 11.
Figure 13:
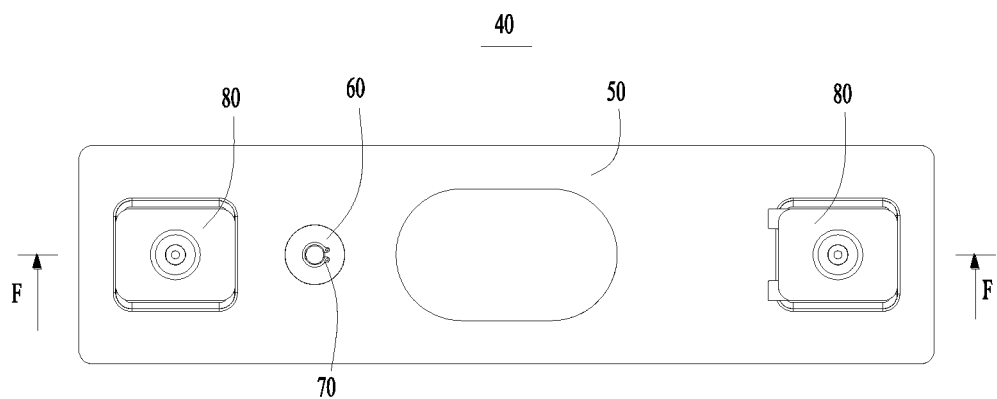
FIG. 13 is a structural schematic top view of the end cover assembly of the embodiment shown in FIG. 11 in an assembling state.
Figure 14:
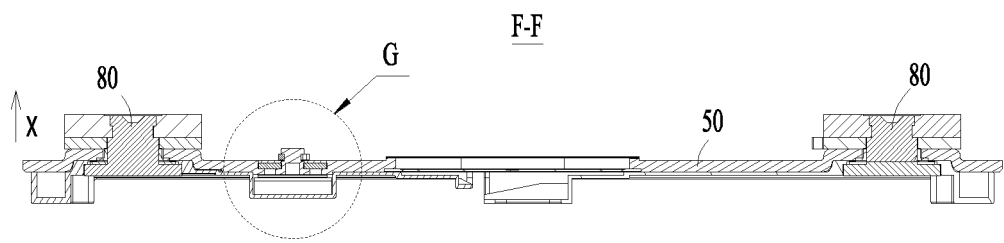
FIG. 14 shows a cross-sectional structural schematic view at a line F-F in FIG. 13.
Figure 15:
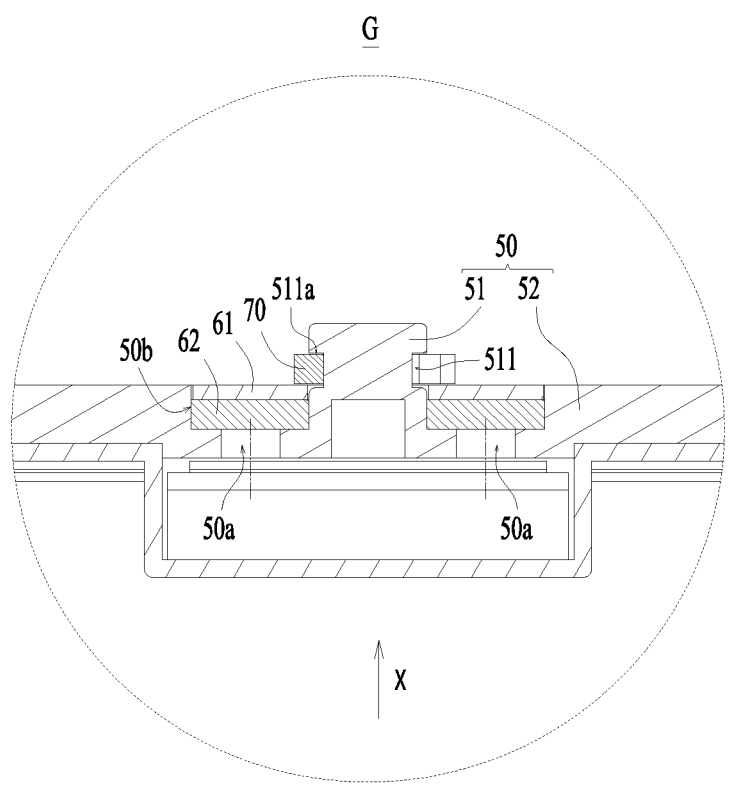
FIG. 15 shows an enlarged view of a portion G in FIG. 14.

In an embodiment, referring to FIG. 11 and FIG. 15, a concave slot 50b is formed on the body portion 52 of the end cover 50. The through hole 50a communicates with the concave slot 50b. The connecting portion 51 is arranged at a bottom of the concave slot 50b. The connecting portion 51 is the column-shaped boss protruding from the body portion 52. After the sealing member 62 is sleeved on the connecting portion 51, at least part of the sealing member 62 is accommodated in the concave slot 50b. The part of the sealing member 62 located in the concave slot 50b can contact with a bottom wall and a side wall of the concave slot 50b and maintain a sealing-fitting state, so that it is beneficial to improve the reliability and stability of the sealing between the sealing member 62 and the end cover 50. In some embodiments, the position-limiting member 61 and the sealing member 62 are integrally located in the concave slot 50b.

After the electrolyte is injected into the secondary battery 30 through the through hole 50a, the sealing member 62 and the position-limiting member 61 are sequentially sleeved on the connecting portion 51, the locking-fixing member 70 is moved in the radial direction of the through hole 50a and snap-fitted with the snapping slot 511 of the connecting portion 51 to lock the locking-fixing member 70 and the connecting portion 51. The locking-fixing member 70 can restrict the position-limiting member 61 and the sealing member 62, and restrict the position-limiting member 61 and the sealing member 62 from moving in the axial direction X of the through hole 50a. When the electrolyte needs to be replenished to the secondary battery 30, the locking-fixing member 70 is first moved in the radial direction of the through hole 50a and removed from the snapping slot 511 to detach the locking-fixing member 70 from the connecting portion 51. In this way, the position-limiting member 61 and the sealing member 62 are removed in the axial direction X of the through hole 50a, and the through hole 50a is exposed. The electrolyte is replenished to the secondary battery 30 through the through hole 50a.

The embodiment of the present application further provides a liquid-injection method for the secondary battery 30, including providing the end cover 50 that includes the through hole 50a and the connecting portion 51, injecting electrolyte through the through hole 50a;

providing the sealing assembly 60;

mounting the sealing assembly 60 to the end cover 50, in which the sealing assembly 60 covers the through hole 50a;

providing the locking-fixing member 70, and moving the locking-fixing member 70 toward a direction close to the connecting portion 51 in the radial direction of the through hole 50a, so that the locking-fixing member 70 locks the connecting portion 51 to restrict the end cover 50 from being separated from the sealing assembly 60, and the sealing assembly 60 maintains in a sealing state.

In an embodiment, when the electrolyte needs to be replenished to the secondary battery 30, the locking-fixing member 70 is moved toward a direction away from the connecting portion 51 in the radial direction of the through hole 50a, so that the locking-fixing member 70 and the connecting portion 51 are unlocked to separate the locking-fixing member 70 from the end cover 50, so as to perform corresponding operations on the sealing assembly 60.

In an embodiment, after the locking-fixing member 70 is moved toward the direction away from the connecting portion 51 in the radial direction of the through hole 50a, the liquid-injection method further includes: removing the sealing assembly 60 from the end cover 50, so that the through hole 50a can be opened, and the electrolyte can be replenished into the secondary battery 30 through the through hole 50a. After completing the electrolyte replenishment work, the sealing assembly 60 is remounted on the end cover 50 and covers the through hole 50a. Then the locking-fixing member 70 locks the connecting portion 51, so that the sealing assembly 60 can maintain in the sealing state.

The embodiment of the present application further provides a liquid-injection device for injecting the electrolyte into the secondary battery 30, including a liquid injection component and a detaching-and-mounting component of the locking-fixing member. The liquid injection component is configured to inject the electrolyte into the through hole 50a. The dismounting-and-mounting component of the locking-fixing member is configured to move the locking-fixing member 70 toward the direction close to the connecting portion 51 in the radial direction of the through hole 50a in the unlocked state, so that the locking-fixing member 70 locks the connecting portion 51 to restrict the end cover 50 from being separated from the sealing assembly 60. Or the dismounting-and-mounting component of the locking-fixing member is configured to move the locking-fixing member 70 toward the direction away from the connecting portion 51 in the radial direction of the through hole 50a, so that the locking-fixing member 70 and the connecting portion 51 are unlocked. The dismounting-and-mounting component of the locking-fixing member can move the locking-fixing member 70 in the radial direction of the through hole 50a, so that the locking-fixing member 70 and the connecting portion 51 can be switched between the locked state and the unlocked state.

In an embodiment, the liquid-injection device further includes a dismounting-and-mounting component of the sealing assembly. The dismounting-and-mounting component of the sealing assembly is configured to mount the sealing assembly 60 on the end cover 50, or dismount the sealing assembly 60 from the end cover 50.

The liquid-injection device in the embodiments of the present application can be used in conjunction with the end cover assembly 40 in the above embodiment, thereby improving the automation control degree of an electrolyte replenishing process of the secondary battery 30, reducing the manual labor intensity, and improving the working efficiency of the electrolyte replenishing process.

Although the present application has been described with reference to some embodiments, various modifications can be made to the present application and the components in the present application can be replaced with equivalents without departing from the scope of the present application. In particular, as long as there is no structural conflict, various technical features mentioned in the various embodiments can be combined in any way. The present application is not limited to the specific embodiments disclosed in the text, but includes all technical solutions falling within the scope of claims.

What is claimed is:

1. An end cover assembly for a secondary battery, comprising an end cover, provided with a through hole for injecting electrolyte therethrough and comprising a connecting portion; a sealing assembly, configured to seal the through hole; a locking-fixing member, configured to be movable relative to the connecting portion in a radial direction of the through hole, so as to realize switching between a locked state and an unlocked state of the locking-fixing member and the connecting portion, wherein in the locked state, the locking-fixing member presses against the sealing assembly to restrict the end cover from being separated from the sealing assembly; in the unlocked state, the end cover and the sealing assembly are separable to allow the electrolyte to be injected from the through hole, wherein the connecting portion is provided with a snapping slot, and at least part of the locking-fixing member is located in the snapping slot to restrict the locking-fixing member from moving in an axial direction of the through hole.

2. The end cover assembly according to claim 1, wherein the locking-fixing member comprises an opening and an accommodating space communicating with each other, and the connecting portion is configured to enter the accommodating space through the opening, or the connecting portion is configured to be separated from the accommodating space through the opening.

3. The end cover assembly according to claim 1, wherein the locking-fixing member is snap-fitted with the connecting portion, so that the locking-fixing member and the connecting portion are in the locked state.

4. The end cover assembly according to claim 1, wherein the snapping slot comprises a position-limiting wall configured to resist against the locking-fixing member in the axial direction.

5. The end cover assembly according to claim 3, wherein the sealing assembly comprises a position-limiting member and a sealing member, the sealing member seals the through hole, and the sealing member is arranged between the position-limiting member and the end cover.

6. The end cover assembly according to claim 5, wherein the position-limiting member comprises a pressing-against portion and a position-limiting portion, the pressing-against portion is connected to the position-limiting portion and covers at least a part of the sealing member, and the locking-fixing member presses against the position-limiting portion to restrict the end cover from being separated from the sealing assembly.

7. The end cover assembly according to claim 6, wherein the end cover further comprises a body portion, and the connecting portion is a boss protruding from a surface of the body portion.

8. The end cover assembly according to claim 7, wherein the through hole is located outside the connecting portion and penetrates the body portion in its own axial direction; each of the position-limiting member and the sealing member has an annular structure and is sleeved and connected to the connecting portion.

9. The end cover assembly according to claim 7, wherein the through hole penetrates the connecting portion and the body portion in its own axial direction, and at least part of the sealing member is located at a side of the connecting portion in the axial direction.

10. The end cover assembly according to claim 9, wherein the position-limiting member further comprises an accommodating slot and a supporting portion connecting to the pressing-against portion and the position-limiting portion, and the accommodating slot penetrates the supporting portion in the radial direction;

the connecting portion passes through the accommodating slot, and a portion of the connecting portion located outside the accommodating slot is misaligned with the position-limiting portion in a peripheral direction of the through hole, and is configured to be locked with the locking-fixing member.

11. The end cover assembly according to claim 5, wherein the end cover comprises a concave slot, the through hole is communicated with the concave slot, and at least part of the sealing member is accommodated in the concave slot.

12. A secondary battery, comprising the end cover assembly according to claim 1.

13. A battery module, comprising the secondary battery according to claim 12.

14. An apparatus comprising the secondary battery according to claim 12, the secondary battery being configured to supply electrical power.

15. A liquid-injection method for a secondary battery, comprising providing an end cover that comprises a through hole and a connecting portion, injecting electrolyte through the through hole; providing a sealing assembly; mounting the sealing assembly to the end cover; providing a locking-fixing member, and moving the locking-fixing member toward a direction close to the connecting portion in a radial direction of the through hole, so that the locking-fixing member locks the connecting portion to restrict the end cover from being separated from the sealing assembly, wherein the connecting portion is provided with a snapping slot, and at least part of the locking-fixing member is located in the snapping slot to restrict the locking-fixing member from moving in an axial direction of the through hole.

16. The liquid-injection method according to claim 15, further comprising moving the locking-fixing member toward a direction away from the connecting portion in the radial direction of the through hole, so as to unlock the locking-fixing member and the connecting portion, and separate the locking-fixing member from the end cover.

17. The liquid-injection method according to claim 16, after the moving the locking-fixing member in the direction away from the connecting portion in the radial direction of the through hole, the method further comprising removing the sealing assembly from the end cover.

18. A liquid-injection device, for injecting the electrolyte into the secondary battery according to claim 13, comprising a liquid injection component, configured to inject the electrolyte into the through hole; and a dismounting-and-mounting component of the locking-fixing member, configured to move the locking-fixing member toward a direction close to the connecting portion in the radial direction of the through hole in the unlocked state, so that the locking-fixing member locks the connecting portion to restrict the end cover from being separated from the sealing assembly; or configured to move the locking-fixing member toward a direction away from the connecting portion in the radial direction of the through hole, so that the locking-fixing member and the connecting portion are unlocked.

19. The liquid-injection device according to claim 18, further comprising a dismounting-and-mounting component of the sealing assembly, configured to mount the sealing assembly on the end cover, or dismount the sealing assembly from the end cover.

* * * * *